April 18, 1967 R. C. BENSON 3,315,177
LASER GENERATOR
Filed April 5, 1962
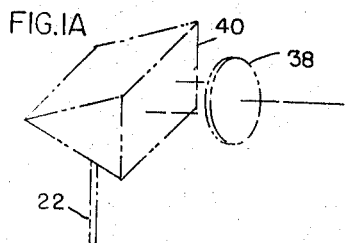
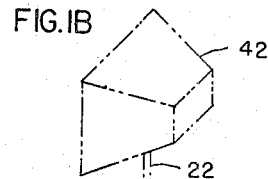
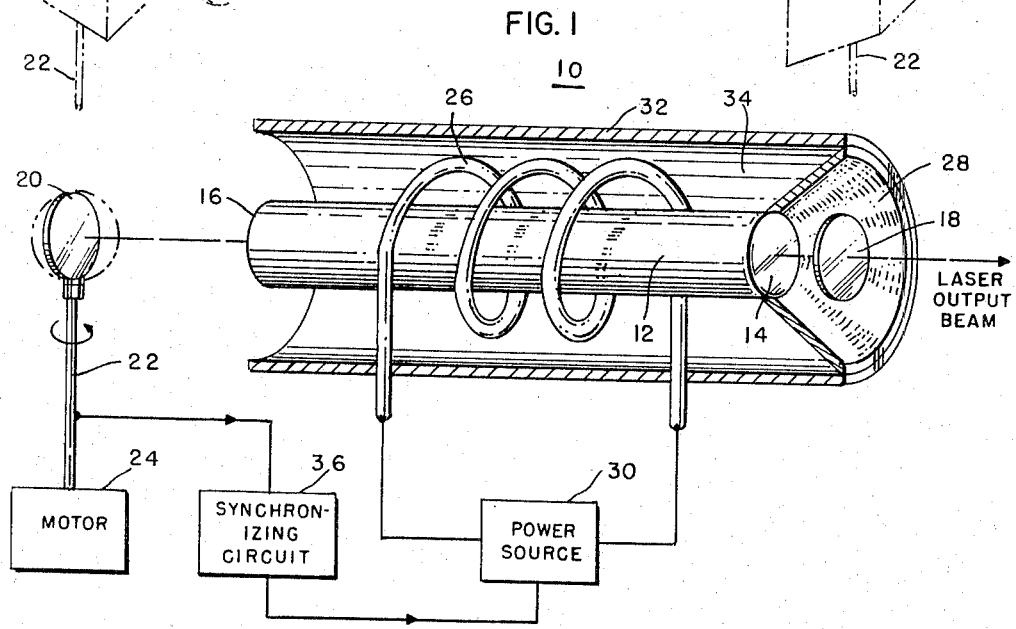
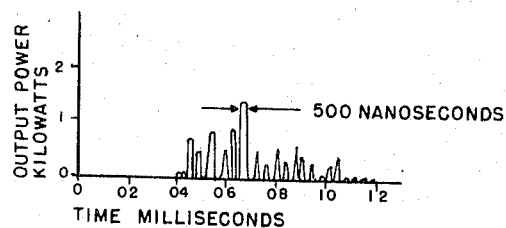
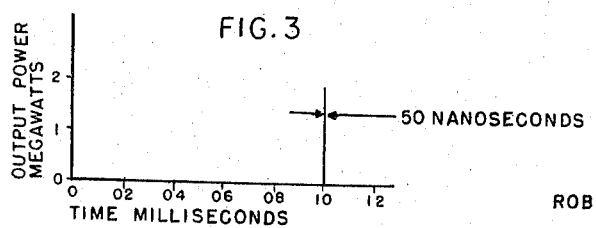
INVENTOR,
ROBERT C. BENSON
BY
*Harry M. Saragovitz*
ATTORNEY.

United States Patent Office 3,315,177
Patented Apr. 18, 1967

3,315,177
LASER GENERATOR
Robert C. Benson, Middletown, N.J., assignor to the United States of America as represented by the Secretary of the Army
Filed Apr. 5, 1962, Ser. No. 185,488
21 Claims. (Cl. 331—94.5)

The invention described herein may be manufactured and used by or for the Government for governmental purposes without the payment of any royalty thereon.

This invention relates to a laser and to a method for producing a single short duration light pulse of higher peak power than previously attained.

Laser stands for "light amplification by stimulated emission of radiation." Following the proposal to extend the maser principle from the microwave region to the optical spectral region some workers in the art have used the acronym "laser" instead of "optical maser." Generally speaking lasers or optical masers may be defined as devices for the generation or amplification of coherent and monochromatic light waves in the visible portion of the spectrum. The general principles of lasers are described in a paper entitled, "Optical Masers," appearing in volume 204, No. 6, of the Scientific American, June 1961, pages 52 through 61.

A conventional laser comprises a doped ruby rod with silvered ends acting as parallel reflectors. Such a laser will go into oscillation when sufficient population inversion has been attained by pumping with a high intensity light source. It has recently been proposed to utilize this ruby rod laser for rangefinding applications. While this prior ruby rod has a peak power which varies up to 2000 watts, with an overall pulse train energy of approximately 0.1 joule in a 10 mil beam width, its use is unsuited for rangefinding applications because it yields a train of low power pulses randomly spaced. Furthermore, this relatively long pulse train duration of about 0.5 millisecond presents severe backscatter problems. In addition, this type of ruby output would require sophisticated correlation apparatus in order to provide rangefinding equipment with adequate range and accuracy characteristics.

It has been found that a laser would be suitable for rangefinding applications if all of its output energy were to be emitted in a single short duration pulse with a fast rise time and a high peak power. As an example, if 0.1 joule of energy were to be released in 0.1 microsecond pulse, the resulting peak power would be 1 megawatt. With such a pulse characteristic, the laser would be ideally suited for use in a single station rangefinder, since the problems associated with backscatter would be nearly eliminated and the range accuracy much improved.

Accordingly, an object of the present invention is a practically realizable, efficient laser device which yields a single high peak power short duration pulse with narrow beam width suitable for rangefinding applications.

It is another object of the invention to provide a method of producing a laser output beam having a burst of light energy of markedly improved intensity, of markedly shortened duration and of substantially narrowed beam width.

An illustrative embodiment of the invention comprises a laser generator including an active laser medium with non-reflecting end surfaces, means for pumping said medium so that a population inversion is produced therein between two separated energy levels, said energy levels being an upper and lower energy level, respectively, said medium having a stationary reflector axially spaced from one end and a rotatably mounted reflector axially spaced from the other end, and means for synchronizing said pumping means and said rotatably mounted reflector whereby said rotatably mounted reflector is positioned parallel with said stationary reflector at the instant when said medium has attained a maximum population inversion.

As will become apparent from the following detailed description, operation of the present invention is dependent on the fact that one of the most critical requirements for laser oscillation is the high degree of parallelism required between the reflectors forming the resonant cavity. If the reflectors are not parallel, reflecting radiation will "walk-off" across the reflector faces and out of the cavity. That is, if the cavity is non-resonant, laser oscillations cannot build up. Therefore, if stimulation is delayed and laser oscillation is prevented by non-parallelism of the cavity reflectors during most of the laser pumping cycle, the population difference between the upper and lower excitation states of the laser medium could be increased over that normally required for oscillation. Thus, if the cavity reflectors are rapidly made parallel at the moment when the laser medium has attained a maximum population inversion, which is substantially above the threshold population difference required for laser action, the output energy would be emitted in a single short duration burst of high peak power.

For a more detailed description of the invention together with other and further objects thereof, reference is had to the following description, taken in connection with the accompanying drawing, in which:

FIG. 1 shows an illustrative embodiment of the invention partly in block schematic form;

FIGURES 1A and 1B are fragmentary views showing modifications of the movable reflector of FIGURE 1;

FIGS. 2 and 3 each show a laser output diagram which will be helpful in explaining the invention.

With reference now to the drawing, the laser 10 shown in FIG. 1 comprises an active laser medium such a synthetic pink ruby 12.

Ruby, which is a crystalline aluminum oxide with chromium atoms substituted for some of the aluminum atoms, has a set of energy levels well suited for use in a laser, as most of the chromium atoms can be placed in an excited metastable state, so that an electromagnetic wave of the right frequency passing through them will stimulate a cascade of photons. Other examples of suitable laser mediums are those using samarium or uranium ions in a calcium fluoride crystal, and the recently announced glass laser which comprises a rod of barium crown glass doped with neodymium ions.

The ruby 12 is generally machined into a rod about 1.5 inches long and ⅜ inch in diameter with the opposite ends 14 and 16, being, preferably, non-reflective. The opposite end surfaces 14 and 16 can be made non-reflective by cutting them at Brewster's angle, or by applying a coating thereon of magnesium fluoride. However, rod 12 may be of different lengths and widths, and the opposite end surfaces 14 and 16 may be polished optically flat and parallel. Although the cross-sectional area of rod 12 is shown in FIG. 1 as round, it may have any geometrical cross-sectional shape such as oval, square, rectangular, or triangular. Due to the rapid deterioration of silver reflective coatings, flat multi-layer dielectric reflectors, made of alternate layers of magnesium fluoride and zinc sulphide, have been used in their stead and found more durable.

A front output reflector 18 is partially reflective. A typical reflectance value of a front reflector for a ruby with the above dimensions is about 50%. Front reflector 18 can be affixed to the end surface 14 of ruby 12, but, more preferably, is axially spaced from surface 14 and mounted with suitable means in a stationary position. A flat reflector 20 of maximum reflectance is axially spaced from the rear end surface 16 of ruby 12, and is rotatably mounted on a shaft 22 rotated by motor 24. Reflectors 18 and 20 are initially aligned by an auto-collimator so that rotatable reflector 20 can be rotated into parallelism with stationary reflector 18.

Ruby 12 is surrounded by an electronic flash tube 26 that provides broadband pumping light thereto. A funnel-shaped cone 28 holds the ruby 12 axially within the helical coil of the flash tube 26, which is energized by a power source 30. Laser 10 further includes a reflective housing 32 which surrounds flash tube 26 and cone 28, and leaves the opposite end surfaces 14 and 16 uncovered. The inner surface 34 of housing 32 is of a material capable of reflecting a major part of the energy, radiated thereon from flash tube 26, into ruby 12. A synchronizing circuit 36 coupled between shaft 22 and power source 30 completes the laser 10.

In carrying out the method of the invention, the synchronizing circuit 36 supplies signals to power source 30 from shaft 22 in such sequence that the firing of flash tube 26 is initiated at a preset time interval before the rotatable reflector 20 becomes parallel with the stationary output reflector 18. This preset time interval is selected so that the rotatable reflector 20 passes through the parallel position with reflector 18 at the instant when ruby 12 has attained a maximum population inversion.

Three examples of reflector configurations for carrying out the method of the invention will now be described. In all three examples, the rotatable reflector can be either the front output reflector or the rear reflector.

(1) Flat reflectors at both the front end and the rear end of the ruby. The device shown in FIG. 1 can be modified by having a rotatable output reflector axially spaced from the front end 14 of the ruby 12; and with a rear stationary reflector 38, shown in dotted lines, axially spaced from the rear end surface 16.

(2) A flat reflector at the front output end of the ruby and a Porro prism at the rear end. A Porro prism is a right angle prism with its base normal to the incident light, so that it reflects almost 100% of the incident light. As shown in dotted lines at 40, the vertex of the Porro prism rotates in a plane normal to the shaft axis 22. Since a Porro prism reflects back incident light in one plane, it optically corrects for reflector misalignment. The prism also tends to average out non-uniformities in the ruby since each oscillating light wave has to traverse two separate paths within the ruby.

(3) A nubbed Porro prism at the front output end of the ruby and a flat reflector at the opposite rear end surface. A nubbed Porro prism, shown in dotted lines at 42 has its vertex ground flat and parallel with its base.

It was found that laser output beam divergence was markedly reduced when the separation distance between the cavity reflectors was increased substantially beyond the laser medium length. With strong pumping of several times threshold, beam divergence was decreased from 10 mils to 1.5 mils when the reflector separation distance was increased in varying amounts from 1 laser medium length up to 20 laser medium lengths. The limiting factor to the decrease in beam divergence with increased reflector separation was attributed to internal crystal scattering.

One example of an embodiment like that of FIG. 1 is as follows: Flat multi-layer dielectric at both front and rear of the ruby were separated by 24 inches. The speed of the rotating reflector was 3600 r.p.m. Front reflector had a reflectance of 50% and the rear rotatable reflector of 99%. The uncooled ruby was ⅜ inch in diameter and 1.5 inches long. A 1 megawatt peak power output with a rise time of 50 nanoseconds and 1.5 angular mil divergence was produced when the ruby was pumped with 3200 joules.

Another particular model of the invention had the following parameters: A nubbed Porro prism was used as the front output reflector, and multi-layer dielectric rotatable reflector of 99% reflectance was at the rear. The uncooled ruby was ⅜ inch diameter by 1.5 inches in length. A peak pulse power of 3 megawatts for single pulse operation with a rise time of 50 nanoseconds was attained using 4000 joule input to a helical flash tube.

FIGS. 2 and 3 show, respectively, the performance of a prior art laser having partially silvered flat parallel ends, compared with the performance of a laser in accordance with the invention.

With respect first to FIG. 2, the output of a prior art laser is shown as a train of random pulses. The relatively low peak power varies from 200 to 2000 watts. The overall pulse train energy is approximately 0.1 joule, and the pulse train duration averages about 0.5 millisecond. The duration of a kilowatt pulse has been measured at approximately 500 nanoseconds at its half-power points.

A typical output pulse of a laser used in the practice of the invention is dipicted in FIG. 3. The shape of the laser output pulse is roughly triangular with a rounding of the tip. The leading and trailing edges are also slightly rounded. The duration of the megawatt pulses have been measured at approximately 50 nanoseconds at the half-power points, and 100 nanoseconds at the base of the pulse. The time, 1.0 millisecond, is an arbitrary time required to bring the rotatable reflector parallel with the fixed reflector at maximum population inversion.

Although the example described utilized a ruby crystal, it is to be understood that the principles of the invention are applicable to any active laser medium in which the desired separation of energy levels are realized.

While there has been described what is at present considered to be the preferred embodiments of the invention, it will be obvious to those skilled in the art that various changes and modifications may be made therein without departing from the invention, and it is therefore aimed in the appended claims to cover all such changes and modifications as fall within the true spirit and scope of the invention.

What is claimed is:

1. A laser generator comprising an active laser medium with non-reflecting end surfaces, said active laser medium disposed within an optically resonant cavity, means for pumping said medium so that a population inversion is produced therein between an upper and lower energy level, said medium having a reflector affixed to one end of said medium and a movable reflector spaced from the opposite end of said medium, means for moving said movable reflector, and means for synchronizing said pumping means and said movable reflector means whereby said movable reflector is positioned parallel with said fixed reflector so as to generate oscillation in said cavity at the instant when said medium has attained maximum population inversion.

2. A laser generator comprising an active laser medium with non-reflecting end surfaces, said active laser medium disposed within an optically resonant cavity, means for pumping said medium so that a population inversion is produced therein between an upper and lower energy level, said medium having a stationary reflector axially spaced from one end of said medium and a rotatably mounted reflector axially spaced from the opposite end of said medium, means for rotating said rotatably mounted reflector, and means for synchonizing said pumping means and said rotatably mounted reflector means whereby said rotatably mounted reflector is positioned parallel with said stationary reflector so as to generate oscillation in said cavity at the instant when said medium has attained a maximum population inversion.

3. A laser generator according to claim 2 in which the active laser medium is a crystal rod of aluminum oxide doped with chromium.

4. A laser generator comprising an active laser medium with non-reflecting end surfaces, said active laser medium disposed within an optically resonant cavity, means for pumping said medium so that a population inversion is produced therein between an upper and lower energy level, said medium having a reflector affixed to one end and a rotatably mounted reflector axially spaced from the other end, means for rotating said rotatably mounted reflector, and means for synchronizing said pumping means and said rotatably mounted reflector means whereby said rotatably mounted reflector is positioned parallel with said fixed reflector so as to generate oscillation in said cavity at the instant when said medium has attained a maximum population inversion.

5. A laser generator comprising an active laser medium in the form of a rod, said medium having non-reflecting end surfaces, said active laser medium disposed within an optically resonant cavity, means for pumping said medium so that a population inversion is produced therein between an upper and lower energy level, said medium having a flat rotatably mounted partial reflector axially spaced from the output end surface of said medium and a flat stationary reflector of maximum reflectance axially spaced from the other end, means for rotating said rotatably mounted reflector, and means for synchronizing said pumping means and said rotatably mounted reflector means whereby said rotatably mounted reflector is positioned parallel with said stationary reflector so as to generate oscillation in said cavity at the instant when said medium has attained a maximum population inversion.

6. A laser generator according to claim 5 in which the distance between the partial reflector and the reflector of maximum reflectance is between 10 to 20 times the length of the laser rod.

7. A laser generator comprising a rod of aluminum oxide doped with chromium having polished optically flat end surfaces, said rod disposed within an optically resonant cavity, means for pumping said rod so that a population inversion is produced therein between an upper and lower energy level, said rod having a stationary partial reflector axially spaced from the output end surface and a rotatably mounted reflector of maximum reflectance axially spaced from the other end surface, means for rotating said rotatably mounted reflector, and means for synchronizing said pumping means and said rotatably mounted reflector means whereby said rotatably mounted reflector is positioned parallel with said stationary reflector so as to generate oscillation in said cavity at the instant when said rod has attained a maximum population inversion.

8. A laser generator according to claim 7 in which the distance between the partial reflector and the reflector of maximum reflectance is between 10 to 20 times the length of the laser rod.

9. A laser generator comprising an active laser medium in the form of a rod, said medium having non-reflective end surfaces, said active laser medium disposed within an optically resonant cavity, means for pumping said medium so that a population inversion is produced therein between an upper and lower energy level, a flat rotatably mounted partial reflector axially spaced from the front output end surface of said medium, the base surface of a Porro prism affixed to the rear end surface of said medium, means for rotating said rotatably mounted partial reflector, and means for synchronizing said pumping means and said rotatably mounted partial reflector means whereby said rotatably mounted partial reflector is positioned parallel with said base surface of the Porro prism so as to generate oscillation in said cavity at the instant when said medium has attained a maximum population inversion.

10. A laser generator comprising an active laser medium in the form of a rod, said medium having non-reflective end surfaces, said active laser medium disposed within an optically resonant cavity, means for pumping said medium so that a population inversion is produced therein between an upper and lower energy level, a flat stationary partial reflector affixed to the front end surface of said medium, a rotatably mounted Porro prism axially spaced from the rear end surface of said medium, said Porro prism aligned so that the base surface thereof is rotatable into parallelism with said stationary reflector, means for rotating said rotatably mounted Porro prism, and means for synchronizing said pumping means and said rotatably mounted Porro prism means whereby the base surface of said rotatably mounted Porro prism is positioned parallel with said stationary reflector so as to generate oscillation in said cavity at the instant when said medium has attained a maximum population inversion.

11. A laser generator comprising an active laser medium in the form of a rod, said medium having non-reflective end surfaces, said active laser medium disposed within an optically resonant cavity, means for pumping said medium so that a population inversion is produced therein between an upper and lower energy level, the base surface of a nubbed Porro prism affixed to the front output end surface of said medium, a flat rotatably mounted reflector axially spaced from the rear end surface of said medium, means for rotating said rotatably mounted reflector, and means for synchronizing said pumping means and said rotatably mounted reflector means whereby said rotatably mounted reflector is positioned parallel with said base surface of the nubbed Porro prism so as to generate oscillation in said cavity at the instant when said medium has attained a maximum population inversion.

12. A laser generator comprising an active laser medium in the form of a rod, said medium having non-reflective end surfaces, said active laser medium disposed within an optically resonant cavity, means for pumping said medium so that a population inversion is produced therein between an upper and lower energy level, a flat stationary reflector axially spaced from the rear end surface of said medium, a rotatably mounted nubbed Porro prism axially spaced from the front output end surface of said medium, said nubbed Porro prism aligned so that the base surface thereof is rotatable into parallelism with said stationary reflector, means for rotating said rotatably mounted nubbed Porro prism, and means for synchronizing said pumping means and said rotatably mounted nubbed Porro prism means whereby the base surface of said rotatably mounted nubbed Porro prism is positioned parallel with said stationary reflector so as to generate oscillation in said cavity at the instant when said medium has attained a maximum population inversion.

13. Method of increasing the beam intensity of a laser which comprises providing an active laser medium with non-reflecting end surfaces, pumping said medium so that a population inversion is produced therein between an upper and lower energy level, positioning a stationary reflector axially spaced from one end of said medium, positioning a rotatably mounted reflector axially spaced from the other end of said medium, and rotating said rotatably mounted reflector whereby it is positioned parallel with said stationary reflector at the instant when said medium has attained maximum population inversion.

14. A laser generator comprising an active laser medium in the form of a rod having a prescribed longitudinal axis, said rod disposed within an optically resonant cavity and having non-reflecting end surfaces, means for pumping said rod so that a population inversion is produced therein between an upper and lower energy level, a stationary reflector and a revolving reflector respectively positioned from the discrete ends of said rod, the plane of said stationary reflector being perpendicular to said longitudinal axis, means for rotating said revolving reflector, and means for synchronizing said pumping means and said revolving reflector means whereby said revolving reflector is positioned such that its plane is perpendicular to said longitudinal axis to generate a light path in said cavity when said rod has attained maximum population inversion.

15. A laser structure comprising a laser component providing a segment of a wave-energy propagation path; means for energizing said component to establish a laserable inversion of energy states thereof; wave-energy reflective means passively terminating a first end of said propagation path; means for terminating a second end of said propagation path including second wave-energy reflective means disposed and adapted to undergo angular displacement about an axis perpendicular to the axis of said path into and out of position reflectively terminating said second end of said propagation path; and means for effecting said angular displacement of said second wave-energy reflective means successively into and out of said position to control the value of the ratio of wave-energy storage to wave-energy dissipation within said path for wave-energy propagation along said path.

16. A laser structure comprising a laser component providing a segment of a wave-energy propagation path; means for energizing said components to establish a laserable inversion of energy states thereof; wave-energy reflective means passively terminating a first end of said propagation path; means for terminating a second end of said propagation path including a mirror providing a wave-energy reflective surface, disposed and adapted to rotate about an axis perpendicular to the axis of said path and to carry said reflective surface successively into and out of position reflectively terminating said second end of said propagation path once during each complete revolution about said perpendicular axis; and means for effecting rotation of said mirror about said perpendicular axis at a predetermined angular velocity to carry said surface successively into and out of said position as aforesaid and thereby rapidly to modify the value of the ratio of wave energy storage to wave energy dissipation within said path for wave energy propagation along said path.

17. A laser structure comprising a laser component providing a segment of a wave-energy propagation path; means for energizing said component to establish a laserable inversion of energy states thereof; wave-energy reflective means passively terminating a first end of said propagation path; means for terminating a second end of said propagation path including second wave-energy reflective means disposed and adapted to undergo angular displacement about an axis perpendicular to the axis of said path into and out of position reflectively terminating said second end of said propagation path; and means for effecting said angular displacement of said second wave-energy reflective means in synchronization with said energizing means to carry said second wave-energy reflective means into said position at a predetermined finite time after initiation of energization of said laser component by said energizing means and thereby to increase the value of the ratio of wave energy storage to wave energy dissipation within said path for wave energy propagation along said path at said predetermined finite time.

18. A laser structure comprising a laser component providing a segment of a wave-energy propagation path; means for energizing said component to establish a laserable inversion of energy states thereof; wave-energy reflective means passively terminating a first end of said propagation path; means for terminating a second end of said propagation path including second wave-energy reflective means disposed and adapted to rotate about an axis perpendicular to the axis of said path in such manner as to pass successively into and out of position reflectively terminating said second end of said propagation path once during each complete revolution about said perpendicular axis; means for effecting rotation of said second wave-energy reflective means about said perpendicular axis at a predetermined angular velocity to carry said second wave-energy reflective means successively into and out of said position as aforesaid successively to increase and decrease the value of the ratio of wave energy storage to wave energy dissipation within said path for wave energy propagation along said path; and means for actuating said energizing means at a predetermined point in the revolution of said second-wave energy reflective means in advance of the point at which said second wave-energy reflective means is carried into said position, to initiate energization of said laser component by said energizing means at a predetermined finite time before said second wave-energy reflective means is carried into said position.

19. A laser structure comprising a laser component providing a segment of a wave-energy propagation path; means for energizing said component to establish a laserable inversion of energy states thereof; wave-energy reflective means passively terminating a first end of said propagation path; a mirror disposed and adapted to rotate about an axis perpendicular to the axis of said path in such manner as to pass successively into and out of position reflectively terminating a second end of said path once during each complete revolution about said perpendicular axis; means for effecting said rotation of said mirror at a predetermined angular velocity to carry said mirror successively into and out of said position within an interval of predetermined length to successively increase and decrease the quality factor of said path within said interval; and means for actuating said energizing means at a predetermined point in the revolution of said mirror in advance of the point at which said mirror is carried into said position, to initiate energization of said laser component by said energizing means at a predetermined finite time before said mirror is carried into said position.

20. A laser structure comprising a laser component providing a segment of a wave-energy propagation path; means for energizing said component to establish a laserable inversion of energy states thereof; wave-energy reflective means passively terminating a first end of said propagation path; a plane mirror disposed and adapted to undergo angular displacement about an axis perpendicular to the axis of said path successively into and out of a position in a plane perpendicular to the axis of said path and in which position said miror reflectively terminates a second end of said path; and means for effecting said angular displacement of said mirror to carry said mirror successively into and out of said position within a time interval of predetermined length and thereby to successively increase and decrease the quality factor of said path within said interval.

21. A laser structure comprising a laser component providing a segment of a wave-energy propagation path; means for energizing said component to establish a laserable inversion of energy states thereof; a wave-energy reflective surface disposed perpendicular to the axis of said propagation path passively to terminate a first end of said path; a plane mirror disposed and adapted to rotate about an axis perpendicular to the axis of said path in such manner as to pass successively into and out of a position parallel to said wave-energy reflective surface and in which position said mirror reflectively terminates a second end of said path once during each complete revolution about said perpendicular axis; means for effecting said rotation of said mirror at a predetermined angular velocity to carry said mirror successively into and out of said position within an interval of predetermined length to successively increase and decrease the quality factor of said path within said interval; and means for actuating said energizing means at a predetermined point in the revolution of said mirror in advance of the point at which said mirror is carried into said position, to initiate energization of said laser component by said energizing means at a predetermined finite time before said mirror is carried into said position.

References Cited by the Examiner

Bell Labs. Record, vol. 39, No. 11, November 1961, p. 395.

Boyd et al.: "Confocal Multimode Resonator for Millimeter Through Optical Wavelength Masers," Bell System Technical Journal, vol. 40, No. 2, March 1961, p. 491.

Hellwarth: "Control of Fluorescent Pulsations," Advances in Quantum Electronics (J. Singer, Ed.), Columbia University Press, New York (1961), pp. 334–341.

McClung et al.: "Giant Optical Pulsations From Ruby," Journal of Applied Physics, vol. 33, No. 3, March 1962, pp. 828 and 829.

Stitch et al.: "Optical Ranging System Uses Laser Transmitter," Electronics, vol. 34, No. 16, April 21, 1961, pp. 51 to 53.

Vogel et al.: "Lasers: Devices and Systems—Part I," Electronics, vol. 34, No. 34, October 27, 1961, pp. 41 to 47.

JEWELL H. PEDERSEN, *Primary Examiner.*

FREDERICK M. STRADER, *Examiner.*

J. L. CHASKIN, R. L. WIBERT, *Assistant Examiners.*